June 4, 1968
H. A. GRIESEMER ET AL     3,386,156
METHOD OF MAGNETICALLY LOADING A MASS OF ARTICLES INTO A WORKHOLDER
Filed Dec. 28, 1965     2 Sheets-Sheet 1
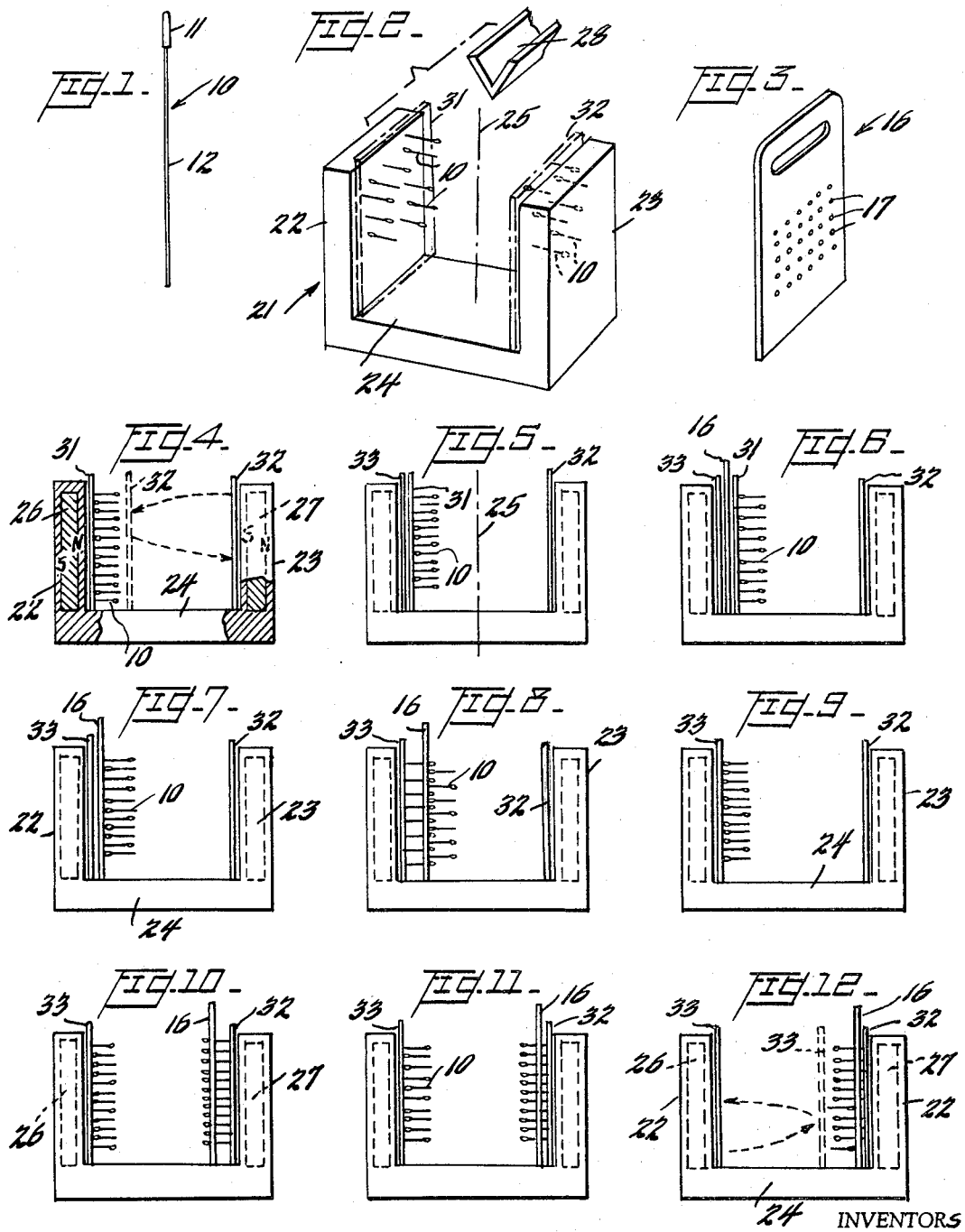
INVENTORS
H. A. Griesemer
D. M. Large,
BY R. P. Miller
ATTORNEY

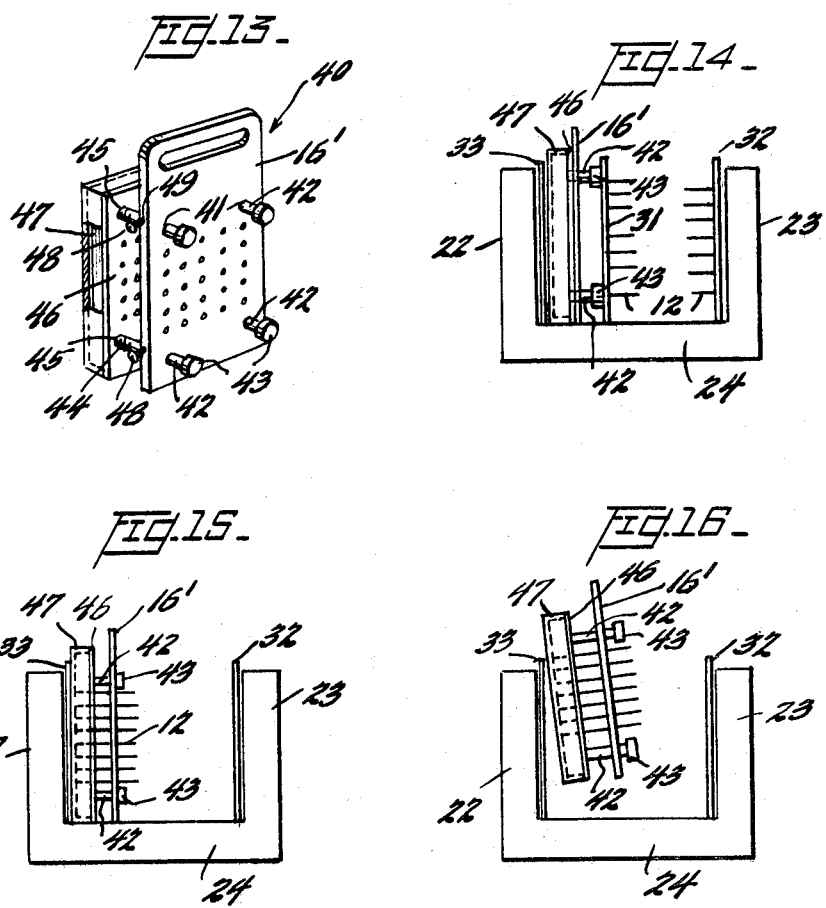

United States Patent Office 3,386,156
Patented June 4, 1968

3,386,156
METHOD OF MAGNETICALLY LOADING A MASS OF ARTICLES INTO A WORKHOLDER
Harold Ammarell Griesemer, Reading, and Donald Martin Large, Temple, Pa., assignors to Western Electric Company, Incorporated, New York, N.Y., a corporation of New York
Filed Dec. 28, 1965, Ser. No. 516,854
9 Claims. (Cl. 29—428)

ABSTRACT OF THE DISCLOSURE

A method of loading an apertured workholder with a mass of elongated paramagnetic articles, deposited in a fixture having magnets at spaced ends thereof to establish a magnetic field having horizontal lines of force to suspend the articles in a generally horizontal manner against two non-magnetic plates, one at each end of the fixture. One of the plates is moved away from the adjacent magnet and the workholder is inserted between the magnet and the plate. The plate is removed to transfer the articles to the workholder, which is manipulated to align the articles with the apertures and allow the magnet to draw the articles into the workholder.

---

This invention relates to a method of magnetically loading a mass of articles into a workholder and more particularly, to an improved method of magnetically aligning and then loading a mass of elongated paramagnetic members into apertures formed in a workholder.

In the manufacture of miniature electrical components, it is more efficient and economical to transport and perform each of the various assembly operations on a mass of parts. For example, in the manufacture of semiconductor diodes it is highly desirable to be able to perform a sputtering operation on a mass of stud-lead assemblies. Similarly, glass-to-metal seals between the stud-lead assemblies and semiconductor wafers are more efficiently formed simultaneously on a mass of articles in a furnace. The present loading procedures of batches of stud-lead assemblies in workholders are time consuming in that they are usually accomplished manually or by semi-automatic machines and on an individual part by part basis.

An object of this invention relates to a new and improved method for magnetically loading a mass of articles into a workholder.

Another object of this invention resides in magnetically suspending a mass of articles in a predetermined orientation, and then magnetically loading the suspended articles into a workholder.

A further object of this invention is to suspend a mass of paramagnetic articles in a magnetic field between two magnets having horizontal lines of force, thereafter drawing all the articles toward one of the magnets into contact with an apertured workholder whereupon the workholder is manipulated horizontally and vertically to align the articles with the apertures to allow the magnets to further draw the articles into the workholder.

With these and other objects in view, the present invention contemplates a method of magnetically suspending and supporting a plurality of paramagnetic articles against one surface of a non-magnetic plate, after which an apertured workholder is inserted behind the other surface of the plate, and then the plate is removed and the workholder is moved transverse to said articles to magnetically draw the articles into the apertured workholder.

More particularly, a mass of paramagnetic articles is fed into a fixture having magnets at right and left hand spaced ends of the fixture to establish a magnetic field having horizontal lines of force to attract and suspend the articles in a generally horizontal manner against two non-magnetic plates, one at each end of the fixture. One of the plates is moved away from the magnet and an apertured workholder is inserted between the pole pieces and the plate whereafter the plate is removed to transfer the articles to the apertured workholder. The workholder is then manipulated back and forth horizontally and up and down vertically to align the apertures with the articles to allow the magnets to draw the articles through the workholder. The workholder is then removed from the magnetic field, turned through 180°, and reinserted against the magnets at the opposite end of the fixture. The articles remaining in contact with the plate are transported to the workholder, after which the workholder is manipulated as hereinbefore described to allow the magnets to draw the articles through the unfilled apertures in the workholder.

Other objects and advantages of the present invention will be apparent from the following detailed description when considered in conjunction with the accompanying drawings wherein:

FIG. 1 is a side elevational view of a stud-lead assembly, a mass of which are magnetically loaded in a workholder by the method of the present invention;

FIG. 2 is a perspective view of a fixture which may be used to effectuate the method of loading hereinafter described;

FIG. 3 is a perspective view of an apertured workholder which is to be loaded by the method of the present invention;

FIGS. 4–12 are a series of views indicating the steps for loading the apertured workholder with a mass of elongated paramagnetic articles or parts;

FIG. 13 is a perspective view of one type of apertured workholder which may be used by this method to load elongated headless wire lead assemblies;

FIGS. 14–16 are a series of views indicating the steps in loading the apertured workholder shown in FIG. 13 with headless wire lead assemblies.

Referring to FIG. 1 there is shown a stud-lead assembly 10 comprising a stud 11 and a paramagnetic wire lead 12. A mass of these assemblies are to be loaded into an apertured tray 16 (see FIG. 3) having an array of apertures 17 with the studs 11 of the assemblies 10 all oriented on one side of the tray and in contact therewith.

Attention is first directed to FIG. 2 which shows a fixture 21 which may be used to practice the method of loading herein described. The apparatus 21 has a pair of upstanding walls 22 and 23 mounted on the left and right hand ends of a base 24 at equal distances from a center line 25 to define a loading space. Positioned in the left and right hand walls 22 and 23 are plate magnets 26 and 27, respectively (see FIG. 4), which establish horizontal magnetic lines of force. As shown, the left hand magnet has a north magnetic pole facing into the space and the right hand magnet has a south magnetic pole facing into the space. Paramagnetic assemblies 10 positioned between the magnets 26 and 27 are aligned along the magnetic lines of force and are attracted toward either magnet so that the ends thereof are attracted toward the inner faces of the walls 22 and 23. Mounted above the fixture 21 is a V-shaped trough 28 which is connected to a conventional vibrating feeder (not shown) for intermittently feeding a supply of assemblies 10 into the apparatus between the magnets 26 and 27. It is to be understood that manual feeding means would also suffice to practice the method.

The fixture which may be used to practice the method also includes a pair of plates 31 and 32 comprised of non-magnetic material that are positioned against the upstanding walls 22 and 23, respectively, and rest against the base 24 between the magnets 26 and 27 (see FIG. 4). The plates 31 and 32 may be constructed of aluminum, brass or other material that will not disturb the magnetic field established between the walls 22 and 23. As the assemblies 10 are fed from the trough 28 into the general central area between the walls 22 and 23, they are horizontally aligned and attracted by either magnet 26 or 27 and are held against one or the other of the plates 31 or 32. At this point, as is shown in FIG. 2, the orientation of the assemblies is random, that is, some of the assemblies have the studs 11 in contact with one of the plates 31 or 32 while other assemblies have the end of the wire lead 12 in contact therewith.

Referring now to FIGS. 4–12, there are illustrated the steps of a method of loading the apertured tray 16, involving a sequence in which the plates 31 and 32 and the tray 16 are manipulated to load the assemblies. After the assemblies 10 have been attracted in random orientation against either of plates 31 and 32, following the feeding, the plate 32 is manually moved in a transverse fashion to the left (see FIG. 4), whereupon the assemblies 10 which are abutted thereagainst are moved past the center line 25 and subsequently attracted by magnet 26 to the plate 31. The plate 32 is then returned to the right to abut the wall 23. The plate 31 now has all of the assemblies 10 abutting thereagainst (see FIG. 5). At this time, the plate 31 is moved slightly to the right and a rectangular plate 33 is manually inserted between the plate 31 and the wall 22.

The plate 31 is again moved slightly to the right and the tray 16 is inserted between the plates 31 and 33 as shown in FIG. 6. As an alternative, the plate 33 and the tray 16 may be inserted between the wall 22 and the plate 31 prior to the step of transferring the assemblies from plate 32 to plate 31. If a large quantity of assemblies have been fed into the fixture, this rearrangement of steps may make it easier to insert the tray behind the plate 31 when the plate 31 has only half the assemblies attracted thereto.

Next, the plate 31 is withdrawn, whereupon the assemblies 10 held in the magnetic field slide over the plate 31. The assemblies 10 are attracted by the magnet 26 and are pulled against the tray 16 (see FIG. 7). At this point, the tray 16 is moved back and forth horizontally, up and down vertically, to move the apertures relative to the ends of the assemblies 10. Those assemblies 10 which have the lead end 12 in contact with the tray 16 enter the aligned apertures 17, which are sized just slightly greater than the lead diameter.

The tray 16 is then moved to the right (see FIG. 8), whereupon the tray is slidably moved along the wire leads 12 until the tray is in contact with the studs 11. Those assemblies having their stud ends 11 on their lead ends 12 abutting the tray 16 are merely moved away from the wall 22. Care should be exercised so as not to move the assemblies past the center line 25, otherwise, the assemblies will be attracted toward the right-hand magnet 27 (see FIG. 8).

The tray 16 is then moved sideways and upwards from the fixture to remove those assemblies which have become positioned in the apertures, while the remainder of the assemblies 10 slide over the tray 16 and remain in contact with the plate 33 (see FIG. 9). The spacing of the apertures 17 is great in comparison with the size of the assemblies 10, so that as the tray 16 is removed from the fixture 21, those assemblies 10 which have entered an aperture will freely pass between the remaining assemblies. At this time, experience has demonstrated that the tray is only partially loaded, especially if it has a close pattern of apertures. Of the remaining assemblies left in the fixture, there is a preponderance of assemblies 10 having the stud end 11 in contact with the plate 33 (see FIG. 9).

If the tray 16 has a close pattern of apertures and is partially unfilled, it may then be rotated through a half-turn and is then reinserted into the right hand side of the fixture 21 with the ends of the wire leads in contact with the plate 32 (see FIG. 10). The tray is then pushed toward the plate 32, whereupon the tray is slidably moved along the wire leads until it is in contact with the plate 32 (see FIG. 11).

Next, the plate 33 is moved toward the right, advancing the unloaded assemblies 10 held against the plate 32 until they are attracted by the magnet 27 to the tray 16 as shown in FIG. 12. The tray 16 is then manipulated as hereinbefore described to move the empty apertures into alignment with lead ends 12, whereupon the magnet 27 draws these assemblies into the tray.

Alternatively, before the plate 33 is moved to transfer the assemblies to the tray, more assemblies may be fed into the fixture 21. These are randomly attracted to either the plate 33 or the tray 16. Then, the plate 33 is moved toward the tray as hereinbefore described to effect the transfer of the assemblies from the left plate 33 to the right load-positioned tray 16. This intermediate feeding step serves to increase the probability of filling a greater number of the apertures 17 in the tray 16.

This method may also be used to load a mass of headless paramagnetic leads 12 into an apertured workholder 40 such as that shown in FIG. 13. The workholder 40 consists of a modified tray 16' having four holes 41, two of which are formed along each side thereof, through which are inserted pins 42 having headed ends 43 which abut the tray 16'. The opposite ends 44 of the pins 42 are threaded and are turned into threaded bores 45 in an apertured plate 46 to align the apertures in the tray 16' with the apertures in the plate 46. A solid plate 47 is fixedly attached to and spaced from the plate 46. Locking means such as set screws 48 are turned into threaded bores 49 in the tray 16' to lock the tray 16' against the pins 42 at any position therealong.

In the practice of the method with this workholder, a mass of headless leads 12 is first fed into the fixture 21. The workholder 40 with the tray 16' mounted on the pins 42 and in contact with the plate 46 is positioned between the plate 31 and the plate 33 as shown in FIG. 14. In this position the solid plate 47 is in engagement with the non-magnetic plate 33. The same sequence of steps as hereinbefore described with respect to loading the stud-lead assemblies, including the withdrawal of plate 31, is performed to load a plurality of leads into the apertures 17.

The tray 16' is moved away from the plate 46 toward the right along the pins 42 for a predetermined distance whereupon the tray 16' is locked on the pins 42 by the set screws 48 (see FIG. 13). Next, the workholder 40 is tilted as shown in FIG. 16, and is removed from the fixture 21. In this manner, the leads 12 will rest against the plate 47 and are prevented from falling out of the tray. Furthermore, because of the spaced relationship of the plate 47 and the tray 16', the leads 12 are held in parallel relationship to one another normal to the plane of the tray. Without the plate 46, the leads may become canted while resting in the apertures in the plate 16' which may make the subsequent unloading of the tray more difficult.

It is to be understood that the above-identified embodiments are simply illustrative of the principles of the invention, and numerous other modifications may be devised without departing from the spirit and scope of the invention.

We claim:

1. A method of loading a plurality of paramagnetic articles into an apertured workholder, which comprises:
magnetically suspending and supporting said articles against one surface of a non-magnetic plate, inserting the workholder behind the other surface of said plate, removing said plate, leaving said articles held against said workholder, and moving said workholder transverse to said articles to magnetically draw said articles through said apertured workholder.

2. A method of loading elongated paramagnetic articles into apertures formed in a non-magnetic tray, which comprises:

establishing a magnetic field with horizontal lines of force, placing a non-magnetic plate in and transverse to said field, feeding a mass of said articles into said field to abut ends of the articles against said plate with said article projecting along said magnetic lines of force, placing the tray behind said plate, removing said plate from said magnetic field, and then moving said tray transverse to said lines of force to move said apertures into alignment with the ends of said articles whereupon said magnetic force moves said articles through said apertures.

3. A method for loading a mass of elongated articles into an apertured workholder positioned in a fixture between first and second opposed magnets, said magnets spaced apart a distance greater than the length of the elongated articles which have been fed into the fixture and randomly attracted to both of said magnets, comprising the steps of:

accumulating all of the articles against the first magnet, interposing the workholder between the articles and the first magnet, and manipulating the workholder in a horizontal and then in a vertical direction to align the apertures with the articles to allow the first magnet to pull the articles through the workholder.

4. A method for loading a mass of elongated articles, having heads at one end thereof, into an apertured workholder positioned in a fixture, as defined in claim 3 comprising the additional steps of:

moving the workholder along the elongated articles which have been pulled into the apertures in said workholder and into contact with the headed ends thereof, removing the workholder from the fixture, reinserting the workholder in the fixture with the unheaded ends of the elongated articles in contact wtih the second magnet, drawing any articles remaining held against the first magnet to the workholder, manipulating the workholder in a horizontal and then in a vertical direction to align the apertures with articles drawn from the first magnet and to allow the second magnet to draw the unheaded ends of the articles transferred from the first magnet through the workholder toward the second magnet, and removing the workholder.

5. A method for loading a mass of elongated articles into an apertured workholder comprising the steps of:

spacing first and second magnets in the fixture a distance greater than the length of the elongated articles, said magnets establishing a magnetic field having horizontal lines of force, feeding a mass of articles between the magnets whereupon the articles are randomly attracted toward the magnets, and held with their elongated axes along the lines of force, drawing all of the articles toward a first magnet, moving the articles away from said first magnet, interposing the workholder between the articles and the first magnet, manipulating the workholder in a horizontal and then in a vertical direction to align the apertures with the articles, and further drawing the articles through the workholder toward the first magnet.

6. A method for magnetically loading a plurality of elongated paramagnetic parts into an apertured tray in a fixture having first and second opposed, spaced magnets, comprising the steps of:

placing a first non-magnetic plate between the magnets in abutting relation with the first magnet, placing a second non-magnetic plate between the magnets in abutting relation with the second magnet, feeding the parts to the fixture whereupon the parts are randomly attracted toward the first or second plates and held thereagainst in a substantially horizontal manner, interposing a third plate between the first plate and the first magnet, inserting the apertured tray between the first and third plates, moving the second plate toward the first plate until the parts positioned against the second plate are pulled from the second plate by the first magnet and attracted to the first plate after which the second plate is returned to its position against the second magnet, removing the first plate whereupon the parts are moved against the apertured tray, and manipulating the apertured tray up and down vertically and back and forth horizontally to align the apertures in the tray with the ends of the elongated parts whereupon the parts are drawn through the apertures by the first magnet to abut the third plate.

7. A method for magnetically loading a plurality of elongated parts, having heads at one end thereof, into an apertured tray between a pair of opposed, spaced magnets as defined in claim 6 comprising the additional steps of:

moving the apertured tray along the elongated parts toward the second magnet, until the tray abuts the headed ends of the parts and removing the tray from the fixture leaving any parts remaining in the fixture held in contact with the third plate.

8. A method for magnetically loading a plurality of elongated parts, having headed ends, into an apertured tray between a pair of opposed, spaced magnets as defined in claim 7, comprising the additional steps of:

turning the tray through a half circle, reinserting the tray between the magnets with the unheaded ends of the elongated parts in the tray abutting the second plate and the headed ends of the elongated parts toward the first magnet, pushing the apertured tray toward the second plate away from the headed ends of the elongated parts, until the tray abuts the second plate, moving the third plate toward the second magnet until those elongated parts positioned against the third plate are attracted to the apertured tray, and manipulating the tray up and down vertically and back and forth horizontally to align the apertures with the unheaded ends of the parts attracted to the tray from the third plate whereupon the parts are pulled through the unfilled apertures by the second magnet to abut the second plate.

9. A method for magnetically loading elongated paramagnetic articles into a workholder having an apertured tray slidably mounted in relation to and aligned with an apertured plate, said apertured plate attached to and spaced from a solid plate, which comprises:

establishing a magnetic field with horizontal lines of force, placing the workholder in and transverse to said field, feeding a mass of articles into said field to abut the ends of the articles against said tray with the elongated axes of said articles along said lines of force, moving said tray transverse to said lines of force to move said apertures of said tray into alignment with the ends of the articles whereupon said magnetic forces move said articles through said apertures of said tray and said plate to abut the ends thereof with the solid plate, slidably moving the tray away from the apertured plate a predetermined distance to support the articles at each end of the predetermined distance and maintain the elongated axes of the articles normal to the tray, and tilting the workholder to support the articles and thereafter removing the workholder from the magnetic field.

References Cited

UNITED STATES PATENTS 3,061,919  11/1962  Tack _____ 29—428
3,117,368  1/1964  Bartik _____ 29—602

WILLIAM I. BROOKS, *Primary Examiner.*